F. N. SPELLER.
METHOD OF FINISHING WELDED PIPES.
APPLICATION FILED FEB. 8, 1913.
1,171,757.
Patented Feb. 15, 1916.
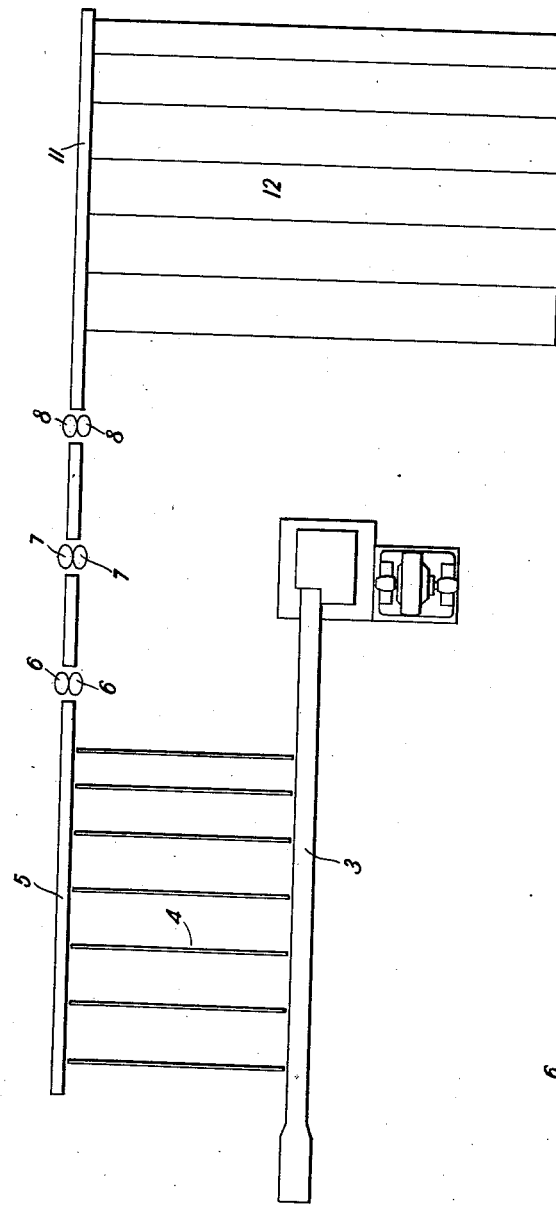
FIG. 1
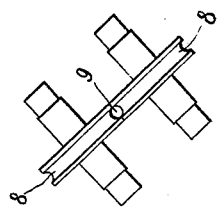
FIG. 2
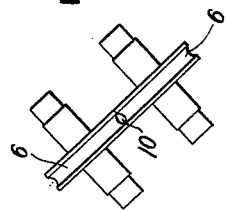
FIG. 3
WITNESSES
INVENTOR
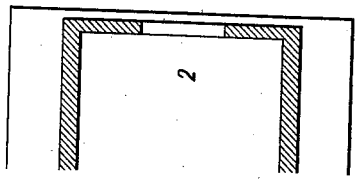

UNITED STATES PATENT OFFICE.

FRANK N. SPELLER, OF PITTSBURGH, PENNSYLVANIA, ASSIGNOR TO NATIONAL TUBE COMPANY, OF PITTSBURGH, PENNSYLVANIA, A CORPORATION OF NEW JERSEY.

METHOD OF FINISHING WELDED PIPES.

1,171,757.  Specification of Letters Patent.  Patented Feb. 15, 1916.

Application filed February 8, 1913. Serial No. 747,044.

*To all whom it may concern:*

Be it known that I, FRANK N. SPELLER, a citizen of the United States, and resident of Pittsburgh, in the county of Allegheny and State of Pennsylvania, have invented a new and useful Method of Finishing Welded Pipes, of which the following is a specification.

My invention relates to the manufacture of welded pipe, and more particularly to the manufacture of the smaller sizes made by the butt-weld process, the general practice being to make pipe up to three inches in diameter by butt-welding and from two inches up to the largest sizes by lap-welding.

In making butt-weld pipe the pipe skelp are heated in a welding furnace until at a welding temperature which is indicated by the scale melting and flowing freely on the surface of the metal. The skelp, after becoming heated, are then successively drawn from the furnace through a welding bell while at the welding temperature, in this operation the skelp being bent into circular form, usually with the seam downward, and the longitudinal edges forcibly pressed together and thereby welded.

In making lap-welded pipes and tubes, the skelp are first scarfed on the longitudinal edges and then bent into circular form until the scarfed edges overlap. The bent skelp are then placed in a welding furnace and heated with the lapped edges on top, the heating being continued until the edges of the skelp and the adjoining metal are at the welding temperature. The skelp are then withdrawn from the furnaces through the circular groove formed by a pair of welding rolls and over a welding ball held centrally between these rolls by a suitable mandrel. The welding mechanism is placed as near as possible to the discharge opening in the furnace so the lapped edges being welded are pressed together between the welding rolls and the ball. In both operations the surfaces of the skelp when heated to the welding temperature are covered with a coating of fluid cinder or scale which acts as a flux for the welding operation. Owing to its fluidity, the "liquor" runs or flows on the surface of the pipe skelp and in making butt-weld pipe, where an internal support is not employed, the cinder or scale adheres tenaciously to the surface of the metal and varies considerably in thickness, the thickest portion being along what is the bottom of the pipe when being drawn through the bell. The scale, being fused onto the hot surface of the steel adheres tightly like enamel and is frequently of sufficient thickness to materially lessen the internal diameter of the smaller pipes. Furthermore, since this scale is electro-negative to iron it accelerates corrosion and promotes pitting of the metal. It is therefore always desirable that this should be removed. The enamel-like quality of the interior scale is further increased by the fusible silicates which are taken up by the skelp in being pulled over the hearth of the welding furnace. In the case of pipes which are afterward to be galvanized or otherwise coated, it is essential that the adhering coating of scale be removed. This is ordinarily accomplished by pickling in a solution of acid, but as the cinder or scale on the exterior surface of the butt-welded pipes is very largely removed in passing through the welding bell, the scale on the inside will be much heavier and it is therefore evident that in pickling the pipes the outer surfaces of the pipes will be freed of scale before the inner surfaces. The difficulty of cleaning the interior of the pipes is further increased by the fact that the acid tends to become stagnant in the interior of the pipes where there is less circulation than around the outside surface. Should the pipe be kept in the pickling solution until the heavy scale on the inside is entirely removed the exterior surface would be over pickled, or, as termed in the art, "burned". This leaves the surfaces of the pipes in a condition which prevents the spelter or other coating from properly adhering, and in order to avoid over-pickling the outside of the pipes the use of a sand blast or other operation is resorted to to remove the residue of scale from the inner surface in order to prepare it for galvanizing or coating without damaging the outside of the pipes by prolonged pickling. Where the presence of scale on the surface of the metal cannot be avoided, the ideal condition would be to have it uniformly thin, with preferably less on the inside than on the outside, which is the reverse of the surface conditions found in pipes made by the modern process of butt-welding.

I have discovered that by a simple mechanical manipulation of the welded pipes when heated to or after becoming cooled below a certain temperature the scale is effectively removed. The underlying principle of my discovery is that by altering or distorting the contour of the pipes while at such temperature, say by the pressure of rolls, the coating of scale is fractured and loosened and will fall from the surfaces of the pipes, so that the completed pipes will have inner and outer surfaces practically free from cinder or scale, any remaining scale being a film of uniform thickness readily removable by a subsequent pickling operation.

In the ordinary process of butt-welding, no provision is made for holding the pipe after being passed through the welding bell. The welded pipe is immediately transferred into a trough and passed into the sizing rolls, from which it is delivered into position to be cut to length and subjected to other finishing operations. Frequently a pipe is in the sizing rolls before, or at the time the succeeding one is being drawn through the bell. The process is carried out thus simply and continuously, the pipes following each other in rapid succession. There is therefore no time for the scale to become set on the interior of the pipes before rolling, the pipes passing through the sizing rolls to round up and make the pipes truly cylindrical at such a high temperature that the scale is still plastic and is not in any way disturbed on the inside of the pipes.

My invention consists in subjecting the welded pipes to a treatment, as, for example, by the pressure of rolls while at a temperature below that at which the cinder or scale sets, and thereby cracking and loosening the thick scale present on the pipes, and my invention contemplates working of the pipes while still heated from the welding operation, this being the most economical method of treatment, but the invention can be utilized by re-heating and then subjecting the re-heated pipes to the scale loosening operation. The temperature at which the scale sets will vary somewhat, but may be said to be when the surface of the pipes is an orange color, or a temperature of approximately 1800 degrees Fahrenheit.

I will describe the application of my invention as a step in the commercial manufacture of butt weld pipes and by the aid of suitable apparatus such as that illustrated in the accompanying drawings.

Referring to the drawings forming part of this specification Figure 1 is a diagrammatic plan showing a convenient arrangement of apparatus adapted for use in making and in carrying out my improved method of finishing butt weld pipes. Fig. 2 is an elevation on a larger scale showing a pair of two-high rolls as arranged in forming one or more of the roll passes used in altering or distorting the pipes to remove the scale in accordance with this invention. Fig. 3 is an elevation similar to that shown in Fig. 2 showing a pair of two-high rolls, as arranged in forming one or more of the roll passes employed in carrying out my improved method.

In the accompanying drawings the numeral 2 designates the welding furnace and 3 the draw-bench on which the pipe skelp are drawn through the welding bell in making butt weld pipes. Alongside the draw-bench 3 is a transfer table or cooling bed 4 to which the welded pipes are delivered sidewise from the draw-bench and on which the pipes are transferred to the trough or conveyer 5 which is located in front of and in line with the passes in the series of pairs of rolls 6, 6, 7, 7 and 8, 8 forming the continuous mill in which the heated pipes are subjected to the pressure by which the scale removing operation is effected. The continuous mill shown comprises three sets of two-high rolls 6, 6, 7, 7 and 8, 8, the pairs of rolls 6, 6 and 7, 7 forming elliptical passes 10 like that shown in Fig. 3 and the rolls 8, 8 forming a cylindrical pass 9 as is shown in Fig. 2. The sets of rolls 6, 6 and 7, 7 may, when desired, be provided with cylindrical passes 9 as shown in Fig. 2 instead of elliptical passes 10 like that illustrated in Fig. 3. A conveyer 11 is provided at the exit side of the rolls of the continuous mill on which the pipes are received from the rolls 8, 8 the pipes being transferred therefrom to and across the storage bed 12 which is located alongside the conveyer 11. When found necessary or desirable a set of cross rolls will be provided which will be located between the last stand of rolls 8, 8 and the conveyer 11, these cross rolls when employed serving to straighten the pipe in the usual manner. The number of stands of rolls employed may be varied also and in some cases as many as six passes being given the welded pipes in carrying out the scale removing operation. When found desirable or necessary all of the rolling passes may be made cylindrical in cross section.

In carrying out the steps of my improved method of finishing pipes in making and finishing butt weld pipes, the pipe skelp are charged into the welding furnace 2 and when heated to a welding temperature are successively discharged from the furnace and drawn through a welding bell on the draw-bench 3 in the usual known manner. The welded pipes are then transferred from the draw-bench to the cooling bed 4 and are gradually moved sidewise across the cooling bed and delivered on the trough or conveyer 5. In traversing the cooling beds the pipes become cooled to the point where the interior of the pipes, which retains the heat longest, is at a temperature below that at which the scale becomes set and brittle. The pipes are successively delivered to the trough 5 and are then moved lengthwise into the bite of the rolls 6, 6 in which they are altered or distorted. The temperature of the scale on the interior of the pipes having been reduced to or below that at which the scale sets and becomes brittle, before engaging with the rolls of the continuous mill, the scale is cracked off and loosened from the surfaces both inside and outside of the pipes while passing between the sets of rolls. The most favorable temperature changing with variations in the composition of the scale, will vary to some extent. The pipes, as they emerge from the rolls 6, 6, enter the bite of the rolls 7, 7, the pass formed between these rolls also in this case being elliptical or oval, with the long diameter of the pass at right angles to the long diameter of the pass formed by the rolls 6, 6. By engagement with the rolls 7, 7 forming the second pass in the mill, the pipes are further altered or distorted, what is the long axis of their cross section after passing through the rolls 6, 6 becoming the short axis in passing through the rolls 7, 7. The pipes in passing through the rolls 7, 7 are further reduced in diameter and increased in length and, to a slight extent, the wall may be upset or increased in thickness with some sizes of pipes. The pipes then pass from the rolls 7, 7 to the rolls 8, 8 in which the altered or distorted pipes are made truly cylindrical, the diameter of the pipes being lessened and the length increased in the series of rolling passes. In some cases it will be found desirable to merely distort and then restore the cross section of the heated pipes in removing the scale, in distinction to reducing the diameter and elongating the welded pipes permanently. It will be found that pipes, after being passed through the rolls, will be substantially free from scale and that the heavy scale heretofore on the surface of the pipes and particularly on the interior of the pipes will have been caused to crack and loosen and drop off the pipe and be substantially all removed so that a substantially clean interior is provided on the pipes. The film of scale remaining on the surface of the pipe will be of uniform thickness so that the pickling operation is much more readily and more effectually carried out in preparing such pipes for galvanizing or otherwise coating the same.

The advantages of my invention will be apparent to those skilled in the art. By means of my improved method the pipes are freed of scale and cinder without interruption of the rapid pipe welding operations and without material increase in the cost of production. In finishing pipe in accordance with my improved method the pipes preferably are permanently reduced in diameter and increased in wall thickness and length in the rolling passes to which the pipes are subjected, although the passes of the rolling mill may be proportioned so as to merely distort and then restore the cross section of the welded pipes without material change in diameter and wall thickness. The terms altered and altering as used herein are intended to cover an operation in which the pipes are permanently reduced in diameter and also that in which the cross section of the welded pipes is first distorted and then restored without substantial decrease in diameter or change in wall thickness.

Modifications in the construction and arrangement of the parts may be made without departing from my invention. The scale may be removed from pipes by reheating to a point below that at which the scale or cinder becomes semi-plastic and then subjecting the heated pipes to the action of the rolls to alter or to distort and then restore the cross section of the pipes. The pipes may be drawn through a die instead of rolled as shown and described, to alter or to distort the cross sectional contour of the welded pipe in the scale removing operation. Any desired number of passes may be given the pipes in the scale removing operations, and other changes in the construction and arrangement of the apparatus may be made in carrying out my improved method as defined in the appended claims.

I claim:

1. The method of finishing welded pipes which consists in altering the cross sectional contour of the welded pipe while heated to a temperature below that at which the scale sets to thereby loosen and remove the scale from the surfaces of the pipe.

2. The method of finishing welded pipes which consists in altering the cross sectional contour of the welded pipe while heated to a temperature slightly below that at which the scale sets on the interior of the pipe to thereby loosen and remove scale from the surfaces of the pipe.

3. The method of finishing welded pipes which consists in distorting and restoring the cross sectional contour of a welded pipe while heated to a temperature below that at which the scale sets to thereby remove the scale from the surfaces of the pipe.

4. The method of finishing welded pipes which consists in distorting and restoring the cross sectional contour of a welded pipe while heated to a temperature slightly below that at which the scale sets to thereby remove the scale from the surfaces of the pipe, and lessening the diameter of the pipe in the distorting and restoring operations.

5. The method of finishing welded pipes which consists in distorting and then restoring the cross sectional contour of the welded pipe while heated to a temperature below that at which the scale sets on the interior of the pipe to thereby loosen and remove scale from the surfaces of the pipe, and elongating the pipe in the distorting and restoring operations.

6. The method of finishing welded pipes which consists in welding the pipe skelp, cooling the welded pipe to a temperature below that at which the scale sets, and then altering the cross sectional contour of the cooled pipe to thereby loosen and remove the scale from the surfaces of the pipe, the pipe being elongated slightly in the scale removing operation.

7. The method of finishing welded pipes which consists in welding the pipe skelp, cooling the welded pipe to a temperature below that at which the scale sets, and then distorting and restoring the cross sectional contour of the pipe to thereby loosen and remove scale from the surfaces of the pipe and elongating the pipe in the distorting and restoring operations.

In testimony whereof, I have hereunto set my hand.

FRANK N. SPELLER.

Witnesses:
 IVAN B. McCORKLE,
 CHRIS. SPRING.